(12) United States Patent
Favilli et al.

(10) Patent No.: US 9,671,163 B2
(45) Date of Patent: Jun. 6, 2017

(54) METHOD AND APPARATUS FOR RECOVERING FROM A PRESSURIZED GAS A LIQUID FRACTION, IN PARTICULAR HYDROCARBONS HAVING TWO OR MORE CARBON ATOMS

(75) Inventors: Stefano Favilli, Rosignano Marittimo (IT); Luciano Scibola, Crema (IT)

(73) Assignee: SIME SRL, Rosignano Solvay (LI) (IT)

( * ) Notice: Subject to any disclaimer, the term of this patent is extended or adjusted under 35 U.S.C. 154(b) by 435 days.

(21) Appl. No.: 13/638,594

(22) PCT Filed: Mar. 29, 2011

(86) PCT No.: PCT/IB2011/000680
§ 371 (c)(1),
(2), (4) Date: Sep. 29, 2012

(87) PCT Pub. No.: WO2011/141782
PCT Pub. Date: Nov. 17, 2011

(65) Prior Publication Data
US 2013/0019612 A1 Jan. 24, 2013

(30) Foreign Application Priority Data

Mar. 29, 2010 (IT) .............................. PI2010A0040

(51) Int. Cl.
*F25J 3/06* (2006.01)
*B01D 45/16* (2006.01)
(Continued)

(52) U.S. Cl.
CPC .............. *F25J 3/061* (2013.01); *B01D 45/16* (2013.01); *C10L 3/107* (2013.01); *C10L 3/12* (2013.01);
(Continued)

(58) Field of Classification Search
CPC .... F16K 47/12; F16K 47/08; F25J 3/06; F25J 3/061; F25J 1/0022; F25J 1/00
(Continued)

(56) References Cited

U.S. PATENT DOCUMENTS 3,990,475 A * 11/1976 Myers ........................ 137/625.3
4,126,294 A * 11/1978 DeFrees ......................... 251/99
(Continued)

FOREIGN PATENT DOCUMENTS

WO  WO 2009/093035  *  7/2009  .............. F16K 3/24

*Primary Examiner* — Justin Jonaitis
*Assistant Examiner* — Joel Attey
(74) *Attorney, Agent, or Firm* — Ladas & Parry LLP

(57) ABSTRACT

An expansion device having a passageway formed orderly by a tubular inlet portion, a tubular throat portion and a tubular outlet portion, with a closing element arranged in the throat portion, the closing element adapted to cause a Joule-Thomson expansion and cooling of an at least partially gaseous fluid that is supplied at a predetermined pressure ($P_1$), where in the inlet portion a direction means is provided for directing the fluid according to a flow direction that is generally at an angle with respect to the longitudinal axis of the inlet portion, in order to reduce the friction of the at least partially gaseous fluid when flowing through the throat portion at the closing element, in order to approximate the transformation to a reversible isentropic transformation more closely than what is possible with the known lamination valves.

10 Claims, 10 Drawing Sheets

(51) Int. Cl.
*C10L 3/10* (2006.01)
*C10L 3/12* (2006.01)
*F16K 47/12* (2006.01)
*F16K 47/08* (2006.01)
*F25J 1/00* (2006.01)

(52) U.S. Cl.
CPC .......... F25J 3/064 (2013.01); F25J 3/0635 (2013.01); *F16K 47/08* (2013.01); *F16K 47/12* (2013.01); *F25J 1/00* (2013.01); *F25J 1/0022* (2013.01); *F25J 3/06* (2013.01); *F25J 2230/32* (2013.01); *F25J 2235/60* (2013.01); *F25J 2240/40* (2013.01)

(58) Field of Classification Search
USPC .................................. 55/467.1; 62/5, 613
See application file for complete search history.

(56) References Cited

U.S. PATENT DOCUMENTS

| | | | | |
|---|---|---|---|---|
| 4,671,321 | A * | 6/1987 | Paetzel et al. | 137/625.3 |
| 7,726,135 | B2 * | 6/2010 | Sullivan | 62/5 |
| 2007/0272316 | A1 * | 11/2007 | Zecchi et al. | 137/625.33 |
| 2008/0122226 | A1 * | 5/2008 | Madison | 290/52 |
| 2008/0173363 | A1 * | 7/2008 | Betting | 137/625.28 |
| 2008/0196582 | A1 * | 8/2008 | Tjeenk Willink et al. | 95/57 |
| 2010/0037771 | A1 * | 2/2010 | Christensen et al. | 95/35 |
| 2012/0057964 | A1 * | 3/2012 | Yang et al. | 415/119 |

* cited by examiner

Fig. 7'
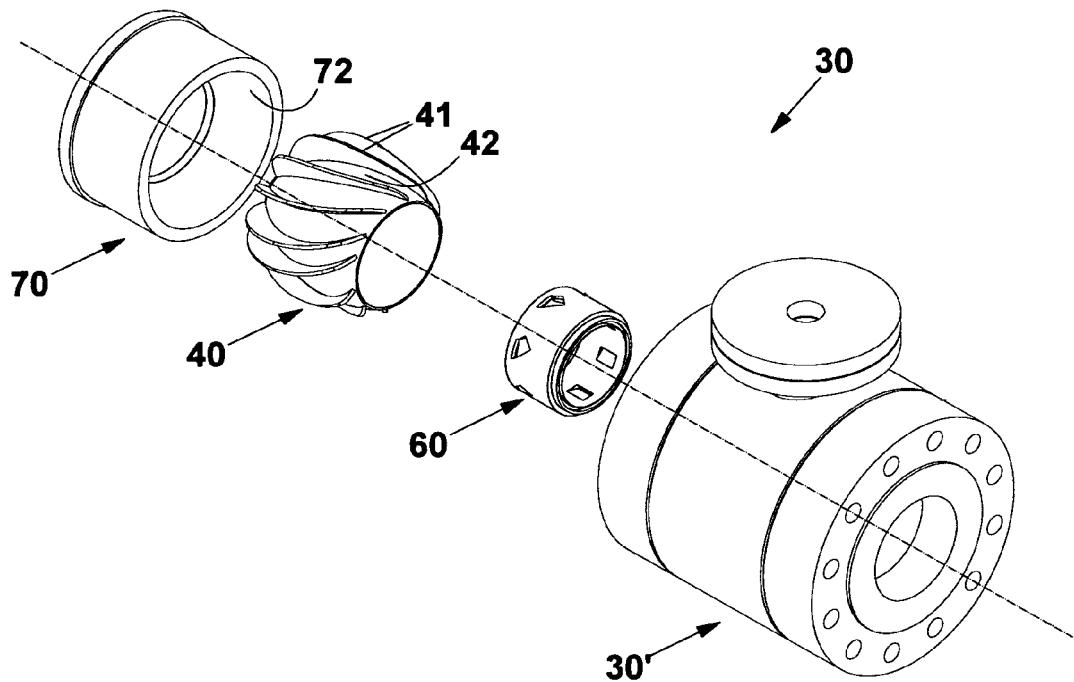
Fig. 7"
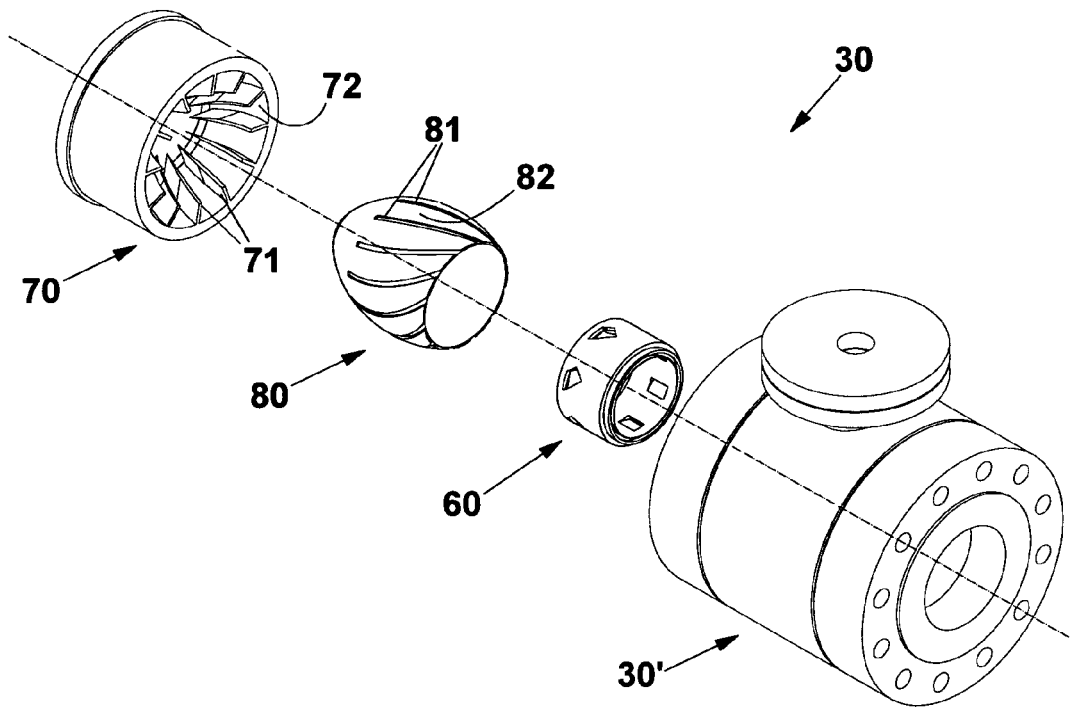

METHOD AND APPARATUS FOR RECOVERING FROM A PRESSURIZED GAS A LIQUID FRACTION, IN PARTICULAR HYDROCARBONS HAVING TWO OR MORE CARBON ATOMS

This application is a 371 of PCT/IB2011/000680 filed on Mar. 29, 2011, which claims priority to Italian patent application number PI2010A000040, filed Mar. 29, 2010.

FIELD OF THE INVENTION

The present invention relates to a method and to a device for carrying out a partial liquefaction of a pressurized gas by Joule-Thomson expansion, separating the formed liquid phase from the gas phase.

In particular, the device and the method are adapted to recover hydrocarbons having two or more carbon atoms (C2+) from a hydrocarbon gas that contains methane, for example, in order to obtain NGLs (Natural Gas Liquids) from a pressurized natural gas, or to obtain LPG (Liquefied Petroleum Gas) from a refinery gas.

BACKGROUND OF THE INVENTION

Technical Problems

There are many cases in which the Joule-Thomson effect is used to separate a condensable fraction from a pressurized gas. For example, the pressurized gas can be expanded in substantially adiabatic conditions, and a cooling is obtained that causes a partial liquefaction of the gas. This is useful for at least partially recovering the least volatile components of the pressurized gas.

For example, natural gas, as extracted from wells or taken from a pipeline, besides methane usually contains hydrocarbons having two or more carbon atoms, hereafter C2+, in particular it contains ethane, propane and butane, which are commonly separated from the natural gas by Joule-Thomson effect. The C2+ have in fact a commercial value that may be much higher than methane, since they are a raw material suitable for a wide range of industrial chemical processes, for example for the olefin production. Therefore, it is not advantageous to burn such hydrocarbons together with methane to obtain energy.

Similar considerations apply to the lightest fraction obtained from crude oil atmospheric distillation, as well as to other refinery gas streams.

A gas, typically natural gas, is normally available at a wellhead or from a natural gas pipeline at a pressure of tenths to hundreds of atmospheres. With reference to FIG. 1, attached hereby, a known and common method for separating C2+ provides expanding the gas through a normal expansion valve 15, which causes such a cooling of the expanded gas that the gas is brought below the dew point of hydrocarbons contained therein; once separated, a C2+ condensate 5 is collected in a separator 16 arranged downstream of expansion valve 15, and is sent to a storage means, not shown, by a transfer means 17.

The above-described process, like any other Joule-Thomson based process, is inherently irreversible; in particular, if standard choke valves are used, the irreversibility degree is so high that the cooling effect and C2+ recovery efficiency is considerably reduced with respect to what could be theoretically obtained in an ideal, reversible transformation. For example, in the device described in WO2006070020, a closing element is provided which has such a shape to impart a helicoidal movement to the fluid threads of the two-phase mixture that is formed during the expansion, said movement maintained until the mixture leaves the device. The device enhances the two-phase separation, since the liquid phase tends to coalesce on outlet section walls into liquid droplets that can be more easily separated from the remaining gas. However, it does not face the problem of significantly reducing the friction that is generated along the path of the gas before the gas is expanded.

In U.S. Pat. No. 7,357,825 a cyclone fluid separator is described, which comprises a tubular throat portion in which a fluid mixture is accelerated up to a subsonic or supersonic speed, and then it is expanded and cooled in such a way that condensable components condensate and/or solidify, and then move helicoidally into a fluid outlet section. The latter comprises a secondary external outlet port and a primary internal outlet port fluid components richer or poorer of condensable matter, respectively, as well as blades that protrude from a central body which extends through at least one part of an inlet section of the separator. The central body has an external width larger than the throat portion minimum width upstream of the throat portion.

Similarly, EP2143474A1 relates to a cyclone fluid separator comprising a throat portion that is arranged between a convergent fluid inlet section and a divergent fluid outlet section, the latter comprising a primary internal outlet port and a secondary external outlet port for fluid components richer or poorer of condensable matter, respectively, and a central body arranged upstream of the throat portion in the inlet section of the fluid and substantially co-axial with a central axis of the separator. The central body comprises an outlet port directed towards the tubular throat portion, to increase a central flow towards the throat portion. Although this device makes it possible to separate by liquefaction a fluid flowing therethrough, it does not allow high liquefaction yields, as it is required to separate NGLs from a pressurized natural gas, or to obtain LPG from a refinery gas.

In particular, the above-described documents do not provide an expansion that is able to maximize the separation between the formed liquid phase and the initial gas phase, and to control at the same time the extent of the expansion and the flow rate of the treated gas.

SUMMARY OF THE INVENTION

It is therefore a feature of the present invention to provide a device and a method for carrying out a partial liquefaction of a gas that is supplied at a predetermined pressure by Joule-Thomson expansion, through a substantially isentropic process, that yields more liquid that that can be separated by standard Joule-Thomson lamination valves.

It is a particular feature of the present invention to provide a method for recovering hydrocarbons having two or more carbon atoms by Joule-Thomson expansion starting from a hydrocarbon gas.

It is another particular feature of the present invention to provide such a device that allows, furthermore, adjusting the pressure downstream of the device and/or the gas flow rate.

It is, furthermore, a feature of the present invention to provide an apparatus for carrying out the above method.

These and other objects are achieved by an expansion device for an at least partially gaseous fluid, comprising:

a tubular inlet portion that is arranged to receive an at least partially gaseous fluid at a predetermined inlet pressure, the tubular inlet portion having an inlet port, an inlet surface consisting of the inner surface of the tubular inlet portion, a longitudinal axis and a generally decreasing cross sectional area, starting from the inlet port;

a tubular outlet portion for the at least partially gaseous fluid;

a tubular throat portion between the tubular inlet portion and the tubular outlet portion, such that the tubular throat portion forms a passageway for an at least partially gaseous fluid;

wherein in the inlet portion a central element is arranged to direct the at least partially gaseous fluid according to a flow direction that is generally at an angle with respect to the longitudinal axis, in order to reduce the friction of the at least partially gaseous fluid when flowing through the device, whose characteristic is that downstream of said central element a closing element is provided in the throat portion, the closing element adapted to cause an expansion with a pressure drop down to a predetermined discharge pressure, a cooling and a partial liquefaction of the at least partially gaseous fluid, said closing element adapted to gradually impart to said fluid a substantially swirling direction that is maintained within an inner recess of the closing element and/or within the outlet portion of the expansion device.

In particular, the central element for directing in the inlet portion is adapted to impart to the fluid a swirling movement, such that a centrifugal force acts on the at least partially gaseous fluid and a transformation occurs of a pressure energy into a kinetic energy that is associated with the swirling movement and such that this centrifugal force assists a separation between the gas phase and the progressively forming liquid phase.

This way, by feeding the expansion device with a pressurized gas, a transformation can be carried out in the body of the device that differs from a reversible transformation between the inlet pressure and the discharge pressure less than what occurs in the known-type lamination valves.

Advantageously, the central element has the a solid of revolution shape, in particular it is an ogive-shaped element fixed within the inlet portion, the ogive-shaped element having an axis that preferably coincides with the longitudinal axis of the inlet portion.

In particular, the closing element is a substantially cylindrical hollow body coaxially connected to one end of the central element opposite to the inlet port of the inlet portion, the cylindrical hollow body having a plurality of holes between an outer cylindrical surface and an inner cylindrical surface, at least one part of the holes arranged proximate to channels of the inlet portion. This way, an optimal efficiency is achieved by gradually imparting the fluid a progressively swirling direction that is maintained within an inner recess of the closing element and/or within the outlet portion of the expansion device.

This way, the central element for directing the fluid in the inlet portion, in particular in case of helical channels, is adapted to create a swirling movement of the fluid, such that a centrifugal force acts on the fluid and, while the gas flows through a progressively decreasing passage area, a transformation occurs of a pressure energy into a kinetic energy that is associated with the swirling movement, and at the same time the centrifugal separation of the resulting liquid phase from the gas phase is enhanced.

Advantageously, the passageway formed between the inlet and tubular outlet portions has a transversal size larger than 3 mm, preferably larger than 4 mm, so that grains of solid particles are allowed to flow therethrough, in particular ice particles and hydrocarbon hydrates particles that may form from water and by combination of the latter with the hydrocarbons of the expanding fluid, with substantially no risk of blocking and damaging the device, which has no moving parts. The residence time of the solid particles that may have been formed is not actually enough for them to grow, due to the high flow speed.

Advantageously, the substantially cylindrical closing element is slidingly arranged within a recess of the central element, such that, as a consequence of a relative sliding movement of the closing element and of the central element a change is produced of the width of the throat portion that is defined between the closing element and the peripheral surface, and a change is produced of the pressure drop of the at least partially gaseous fluid.

The expansion device may also comprise an adjustment means for actuating a sliding movement of the closing element within the recess of the central element, between a first predetermined position and a second predetermined position. This allows adjusting the position of the closing element, i.e. of the device opening, such that the pressure drop and the total gas flow rate can be controlled. In particular, the adjustment means is adapted to receive a control signal of a process variable and to actuate a movement corresponding to such control signal through a regulation signal.

In an exemplary embodiment, the means for directing the at least partially gaseous fluid comprises channels arranged along the inner surface of the inlet portion.

In particular, the inlet portion comprises a central portion that has a central surface such that an annular passage is defined, the channels defined by a plurality of baffles that are arranged according to the flow direction along the annular chamber.

In particular, each baffle is integral with a respective connection surface selected between the central surface and the peripheral surface of the annular chamber.

Preferably, all the baffles are integral to a same connection surface, which is selected between the central surface and the peripheral surface of the annular chamber.

Preferably, the channels have a helical profile, i.e. they are arranged along respective adjacent spirals on the connection surface of the baffles. This way, the at least partially gaseous fluid follows a swirling movement, which has the above described advantages.

In particular, each baffle is housed in a respective seat that is made on a surface of the chamber opposite to the respective connection surface, such that a fluid tight engagement is provided between adjacent channels of the plurality of channels.

The above-mentioned objects are also achieved by a method for carrying out a partial/further liquefaction by Joule-Thomson expansion of an at least partially gaseous fluid that is available at a predetermined inlet pressure, the method comprising the steps of:

prearranging an expansion device of the above-described type;

feeding the at least partially gaseous fluid at the predetermined inlet pressure into the expansion device through the inlet port; wherein an expansion and a cooling effect of the at least partially gaseous fluid takes place in the passageway, such that the at least partially gaseous fluid forms a gas fraction and a liquid fraction according to mutual ratios that are responsive to the cooling that has been achieved, the initial conditions of the at least partially gaseous fluid being the same, i.e. the inlet temperature and/or composition conditions of the at least partially gaseous fluid being the same.

Since the above-described device enables expansions with a lower irreversibility degree than in the known lamination valves, under the same inlet conditions and under the same device inlet-to-outlet pressure jump conditions, a high temperature decrease is achieved and, accordingly, a larger amount of liquid is obtained to be recovered, with respect to what is allowed by standard choke valves.

In particular, a step is provided of prearranging a separation chamber downstream of the outlet port, and a step is provided of separating the liquid and gaseous fractions into respective streams, typically according to well known techniques.

The fluid that is supplied at a predetermined pressure can be a gas that contains methane and at least one hydrocarbon with two or more carbon atoms, and the liquid fraction contains the at least one hydrocarbon with two or more carbon atoms. In this case, the transformation occurs with a better phase separation efficiency of the at least one hydrocarbon with two or more carbon atoms into the gas phase and the liquid phase; in particular, in the case of a natural gas extracted from a well or taken from a natural gas pipeline, or in the case of a refinery pressurized gas, a better separation efficiency can be obtained for such hydrocarbons as ethane and, in particular, propane and butane.

Advantageously, the inlet pressure is set between 15 and 300 bar, in particular between 35 and 130 bar. In the latter case, the discharge pressure may be comprised, between 3 and 30 bar and the temperature at which the two-phase gas-liquid mixture is maintained may range between +5° C. and −80° C. The use of the device according to the invention is advantageous also in case of relatively high discharge outlet temperature, in particular of a temperature higher than −45° C. In case of relatively low inlet pressures and/or in case of limited pressure drops, expensive known systems can be used, such as turboexpanders of known type, that are in any case disadvantageous; besides, the latter are practically impossible to use in case of sensible moisture presence, i.e. if the dew point referred to water is relatively high, in particular if it is higher than −45° C.

The at least partially gaseous fluid may contain a predetermined amount of a component that can lead to the formation of a solid in the fluid, if the latter is cooled down to a temperature lower than the formation temperature of a solid, and if the cooling is prosecuted to the formation temperature. In particular, the component that can lead to the formation of a solid may be water, and the solid may be ice and/or a compound that is formed from a combination of the water with a component of the gas, for example the solid can be a hydrocarbon hydrate. In the case of a natural gas, the water may reach the saturation condition, or a volume concentration up to 105÷145 ppm, which is a typical specification for natural gas of warm regions such as South-East Asian countries, or 20÷60 ppm volume, which is the typical specification for natural gas in colder regions as North European countries, or water can be is present in traces or may be practically absent, in other words it may have a volume concentration lower than 1 ppm, like a gas that has been dried on molecular sieves.

The residence time of the gas in the passageway of the expansion device is short enough to prevent the growth of ice or hydrocarbon hydrates solid particles that may have been formed due to the cooling temperature. Accordingly, the device according to the invention allows treating a wet natural gas, i.e. a gas that contains an amount of water that in the inlet conditions of the expansion device may be equal to or even higher than the saturation value; this enables omitting a fine preliminary gas dehumidification, which, on the contrary, is required by turboexpanders.

Advantageously, before the step of feeding, a step is provided of preliminary cooling the at least partially gaseous fluid. Preferably, the step of preliminary cooling the at least partially gaseous fluid is carried out by exchanging heat with at least one of the fractions that have already been separated from the at least partially gaseous fluid in a heat exchanger, for example in a countercurrent double pipe heat exchanger.

Before the step of feeding, a step may be provided of separating a liquid possibly formed after the heat exchange due to the partial preliminary cooling.

The at least partially gaseous fluid that is supplied at a predetermined pressure may also be a gaseous mixture that contains methane and, besides, hydrocarbons, also hydrogen. This gaseous mixture may be taken from a refinery plant, from a petrochemical plant and/or from a hydrogen production plant by steam-reforming of hydrocarbons and mixtures thereof such as methane, LPG, light naphtha, from a steam-cracking plant to produce ethylene, generally as a bottom gas, from which hydrogen can be recovered in an industrially acceptable amount and quality. A minimum quality of the hydrogen cryogenically separated from heavier fractions is normally obtained by increasing the so-called Linde recycle, which is essentially formed by liquid methane that is expanded from a pressure of about 30 bar to a pressure of 4÷5 bar g through a Joule-Thomson valve, and mixing the Linde recycle with a part of the gaseous hydrogen, which expands accordingly between the above-mentioned pressure values. The device according to the invention reduces sensibly the Linde recycle, in particular it reduces the hydrogen stream to be expanded.

In this way, it is possible to recover an important amount of hydrogen, which has a heating power 2,5÷3 times higher than the fuel gas, and which may be even more profitable than the production of thermal energy by combustion. For instance, concerning refinery, the hydrogen can be used for desulfurization of liquid fuel such as gasoline or diesel oil.

The above-mentioned objects are also achieved by an apparatus for carrying out a partial/further liquefaction by Joule-Thomson expansion of an at least partially gaseous fluid that is available at a predetermined inlet pressure, the equipment comprising:

an expansion device of the above-described type;

a feeding means for feeding the at least partially gaseous fluid at the inlet pressure into the expansion device through the inlet port; such that, by feeding the at least partially gaseous fluid into the expansion device, an expansion and a cooling effect of the at least partially gaseous fluid takes place within the passageway, and such that the at least partially gaseous fluid forms a gas fraction and a liquid fraction according to mutual ratios that are responsive to the cooling and to the initial conditions of the fluid, and to its composition as well.

In particular, the apparatus is adapted to receive a hydrocarbon gas that contains methane and at least one hydrocarbon with two or more carbon atoms at a predetermined pressure, such that by feeding the apparatus with the hydrocarbon gas, the at least one hydrocarbon with two or more carbon atoms is at least partially separated from the hydrocarbon gas.

Advantageously, the apparatus comprises a separation means, in particular it comprises a separation chamber, downstream of the outlet port of the expansion device, such that the liquid fraction and the gas fraction separate from each another into respective streams.

Advantageously, the apparatus provides a means for preliminary cooling to the at least partially gaseous fluid, which is arranged upstream of the inlet port of the expansion device.

Preferably, the means for preliminary cooling comprises at least one exchanger that is arranged to convey, for example countercurrently, at least one of the fractions that have been separated. In particular, two countercurrent exchangers are provided, in one of which a part of the mixture flows countercurrently with respect to the separated liquid fraction, and in the other of which the other part of the mixture flows countercurrently with respect to the separated gas fraction.

BRIEF DESCRIPTION OF THE DRAWINGS

The invention will be made clearer with the following description of an exemplary embodiment thereof, exemplifying but not limitative, with reference to the attached drawings, in which the same reference characters designate the same or similar parts, throughout the figures of which:

FIGS. 7',7" are exploded views of exemplary embodiments of the expansion device according to the invention, in particular FIG. 7' relates to the exemplary embodiment of FIG. 2;

DESCRIPTION OF A PREFERRED
EXEMPLARY EMBODIMENT

Figure 2:
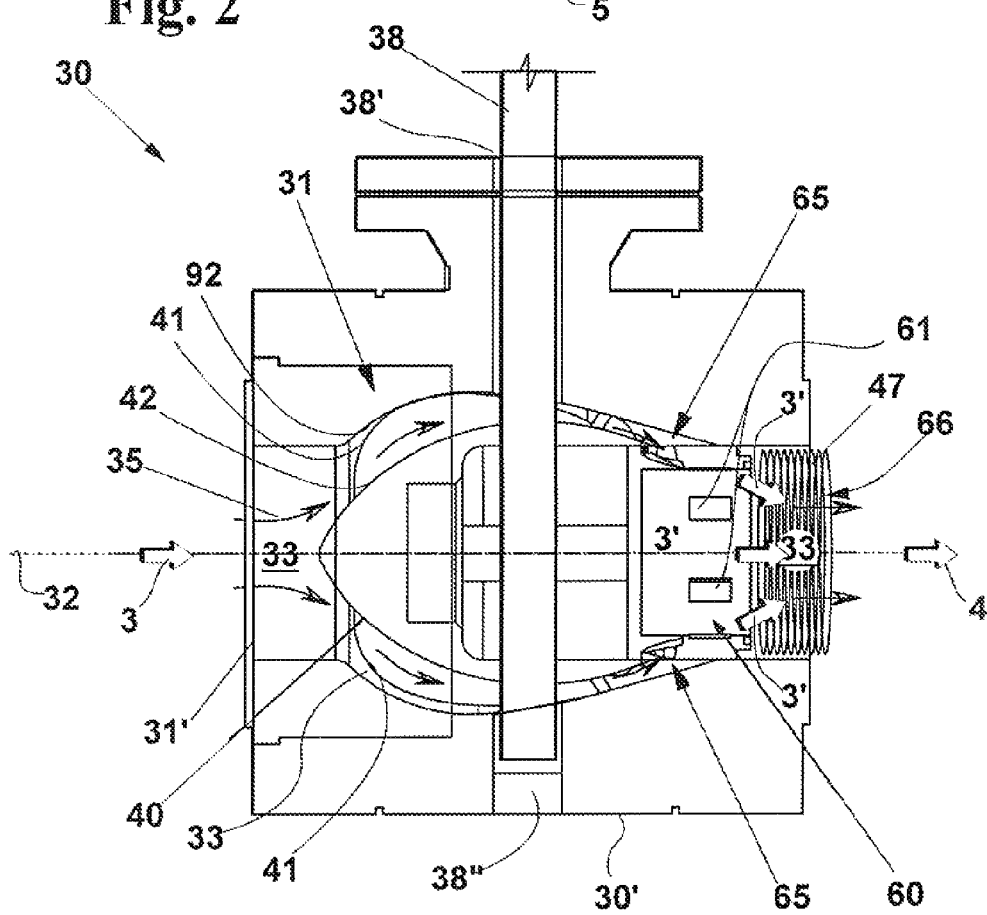
FIG. 2 is a cross sectional view of a gas expansion device according to an exemplary embodiment of the invention.

FIG. 2 shows a cross sectional view of an expansion device 30 according to a first exemplary embodiment of the invention. Expansion device 30 comprises a body 30' that defines a passageway 33. Passageway 33 comprises a tubular inlet portion 31 that is arranged to receive a stream 3 of an at least partially gaseous fluid that is available at a predetermined inlet pressure $P_1$. Tubular inlet portion 31 has an inlet port 31', a longitudinal axis 32 and a cross section, with a not increasing size starting from inlet port 31'; in the represented exemplary embodiment, tubular inlet portion 31 is an annular chamber, the cross sectional area of which progressively decreases, which is defined between a central surface 42 and a peripheral surface 92. A direction means for directing stream 3 is also provided within inlet portion 31, which imparts to the stream a flow direction, in particular a plurality of flow directions 35 that are at an angle with respect to longitudinal axis 32. The direction means for directing stream 3 comprises baffles 41 integral to central surface 42 of inlet portion 31, which central surface acts as a connection surface of baffles 41; in an alternative embodiment, not shown, baffles 41 may be all or partially integral to peripheral surface 92 of inlet portion 31.

Figure 3:
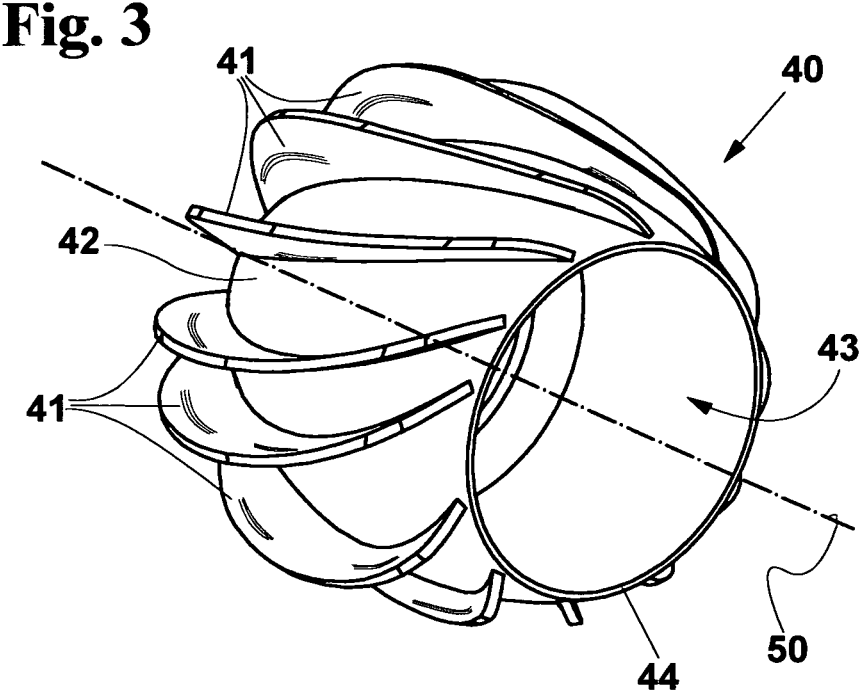
FIG. 3 is a perspective view of a central element of a passageway of the expansion device of FIG. 2.
Figure 4:
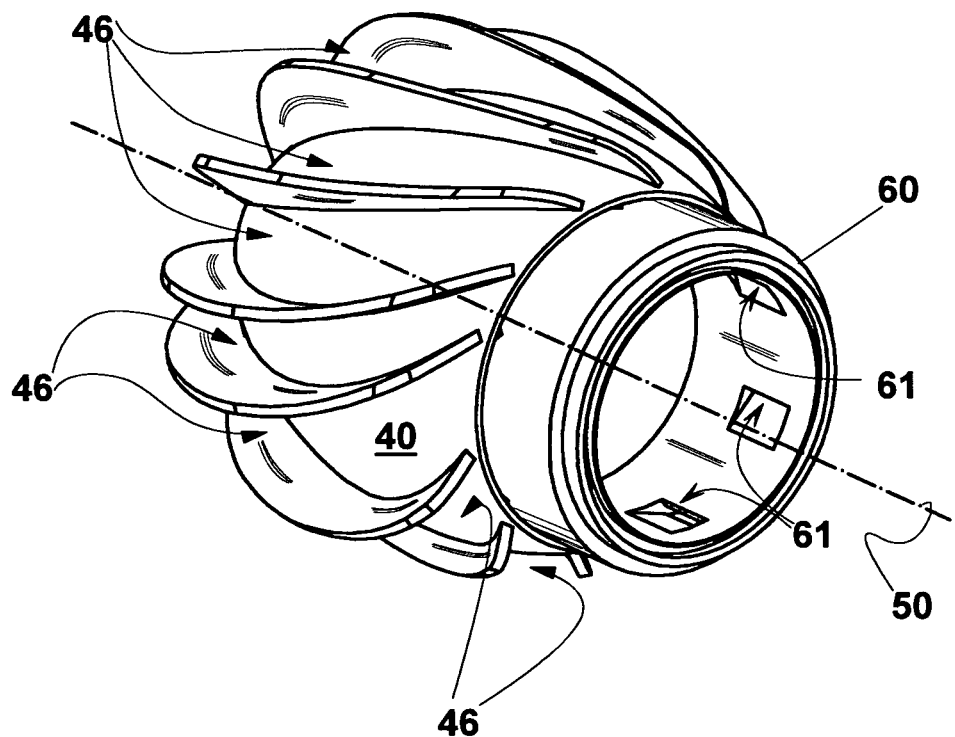
FIG. 4 is a perspective view of a central element combined with a closing element of the expansion device of FIG. 2.
Figure 5:
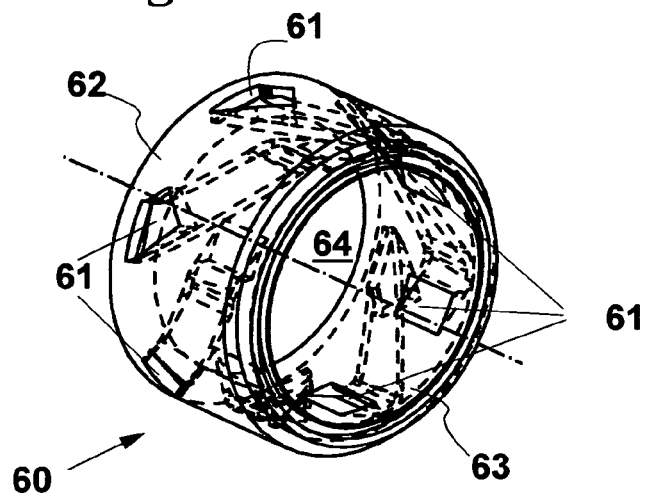
FIG. 5 shows a detail of the helical channels of the closing element according to the exemplary embodiment of FIG. 4.

Surface 42 is defined by an ogive-shaped element 40, which is shown more in detail in FIG. 3, and has an axis 50 substantially coincident with axis 32, such that ogive-shaped element 40 occupies a central portion of body 30', thus defining a part of passageway 33 of device 30. Ogive-shaped element 40 is maintained fixed within body 30' of device 30 by a pin 38 that engages with holes 38',38" of body 30' of device 30, and a through hole defined by central ogive-shaped element 40, not shown in FIG. 3. At an end 44, opposite to the end that faces inlet port 31', central ogive-shaped element 40 has a recess 43 that provides a slide seat for a substantially cylindrical closing element 60, as shown in FIGS. 4 and 5.

Baffles 41 define a plurality of channels 46 (FIG. 4) having a helical profile, i.e. channels 46 are arranged along respective adjacent spirals arranged on central surface 42.

Downstream of inlet portion 31 there is a tubular throat portion 65, where closing element 60 is arranged movable within throat portion 65, such that, while crossing throat portion 65, the at least partially gaseous fluid stream 3 is subject to a pressure drop, turning into an at least partially gaseous fluid stream 3' at a pressure $P_2$ lower than inlet pressure $P_1$.

Baffles 41, whose shape contributes to define decreasing passageway 33, in particular within throat portion 65, and therefore assists to achieve the pressure drop, tend to impart to the flow a centrifugal component, and a substantially helical advancing movement through a throat 65', which is left free from closing element 60.

Inlet pressure $P_1$, at which stream 3 it is supplied, is higher than the pressure at which stream 3' leaves throat portion 65, because a partial pressure recovery occurs at the expenses of the kinetic energy that the fluid has in outlet zone 66. Pressure drop $\Delta P = P_2 - P_1$ normally depends upon pressure $P_1$, at which stream 3 is supplied, and upon the flow rate of stream 3. In case of a gas stream in which no liquid phase is present, such a pressure drop may cause a partial liquefaction of the gas, therefore stream 3 may turn into an at least two-phase mixture where a liquid phase is present. More in detail, pressure drop $\Delta P$ and a subsequent temperature decrease $\Delta T$ may, according to the Joule-Thomson effect, bring the gas at pressure and temperature conditions where a liquid-vapour system is thermodynamically stable, such that stream 3', downstream of throat portion 65, i.e. downstream of closing element 60, is a multiphase stream where at least one phase is a liquid phase, even if a liquid phase is missing in stream 3. Downstream of closing element 60 and of throat portion 65 a tubular expansion portion 66 is provided for stream 3' that turns into stream 4.

In an exemplary embodiment, throat section 65' doesn't block the fluid flow for any position of closing element 60, in order to allow in any case the passage of possible solid bodies.

Figure 6:
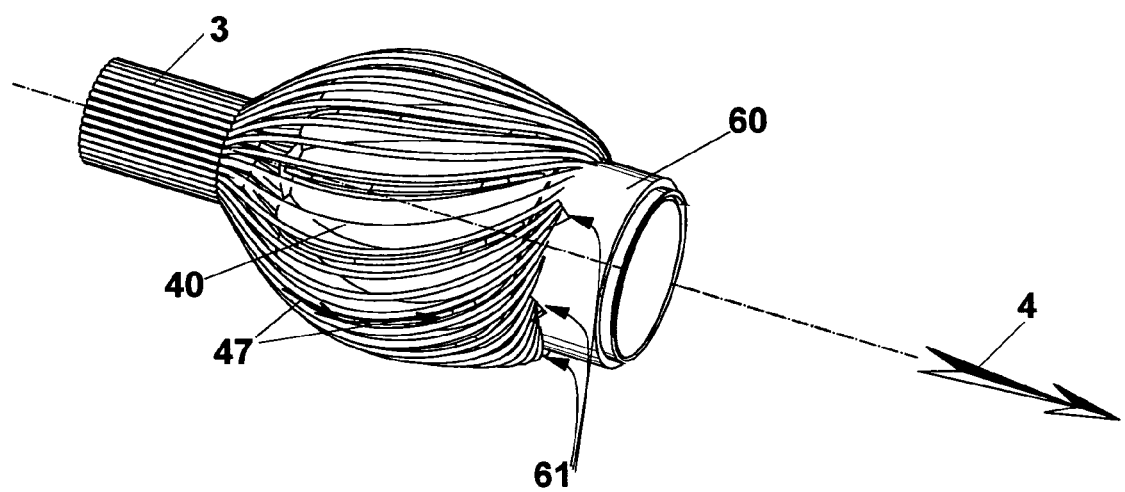
FIG. 6 diagrammatically shows the evolution of the fluid threads of a gas expanding through the expansion device consisting of the central body and of the closing element of FIG. 3.

FIG. 4 shows closing element 60 coaxially mounted with ogive-shaped element 40. Closing element 60 has a plurality of holes 61, which are arranged between its own outer cylindrical surface 62 and an inner cylindrical surface 63, and which, according to the invention, have preferably a direction which is different from the radial one, in particular they have a direction substantially tangential to surface 62/63 of the closing body. Holes 61, preferably all holes 61, are arranged with an own inlet port at surface 62 proximate to channels 46 of inlet portion 31, which are defined by baffles 41 on ogive 40. In other words the holes are arranged along a generatrix corresponding to channels 46. This way, as shown in FIG. 6, a portion of the stream that leaves each channel 46 flows through a respective hole 61 of the closing element, and achieves gradually a substantially helical movement 47 that is maintained inside a recess 64 of the closing element and/or within an outlet portion 66 of the expansion device (see also FIG. 2).

Due to a relative sliding movement of closing element 60 and of central element 40, a change occurs of the width of throat portion 65, which is defined between closing element 60 and peripheral surface 92, in particular a change of the cross sectional area of the multiple throat that is defined by holes 61, which have respective outlet ports cut by closing element 60, This way, it is possible to adjust pressure drop ΔP=P2−P1 and/or the flow rate of stream 3-3'.

FIG. 7' is an exploded view of device 30 according to the exemplary embodiment shown in FIG. 2; in addition to the above-described components and details, a ring element 70 is shown, whose inner surface 72 forms a peripheral inlet surface portion 31 of passageway 33 of device 30 (FIG. 2).

FIG. 7" is an exploded view similar to the view of FIG. 7', where another exemplary embodiment of device 30 is shown, where baffles 91,71 that define the helical channels of inlet portion 31 are integral to the peripheral surface formed by inner surface 92 of the body of device 30' and by inner surface 72 of ring element 70. The details of the exemplary embodiments of body 30', of an ogive-shaped element 80 and of ring element 70, corresponding to the exemplary embodiment of the device of in FIG. 7", are shown in FIGS. 8, 9 and 10, respectively.

Figure 9:
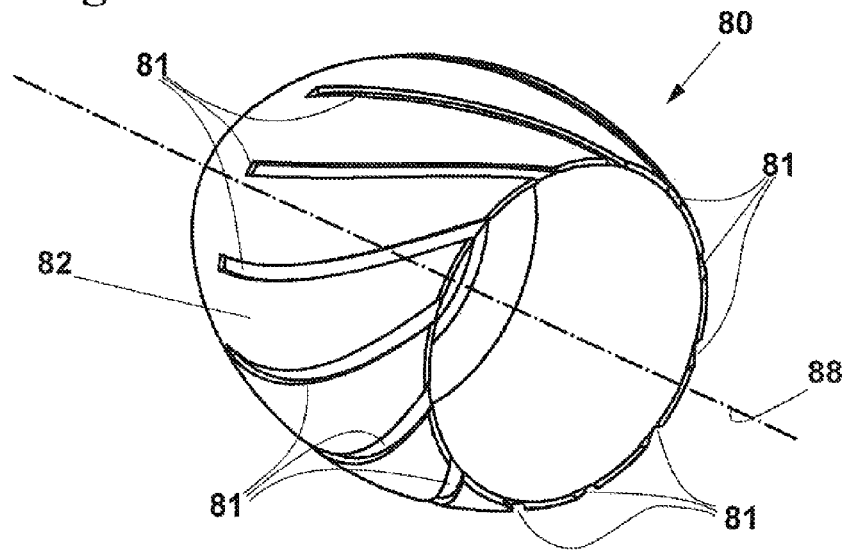
FIG. 9 is a perspective view of a central ogive-shaped element of the passageway of the expansion device according to an exemplary embodiment of FIG. 7"
Figure 10:
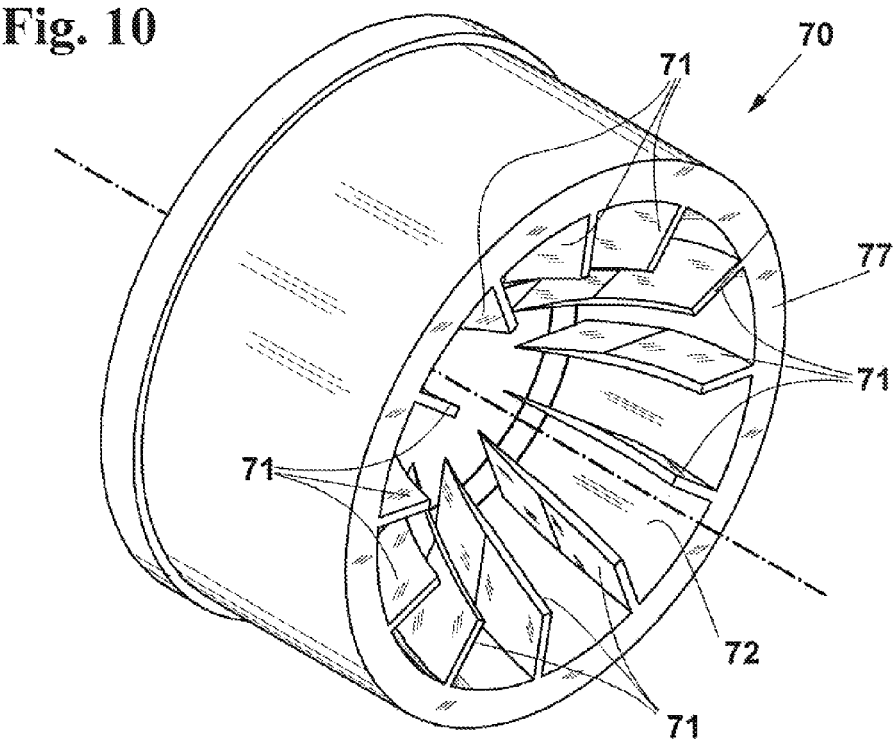
FIG. 10 is a perspective view of a fixing element for fixing the central ogive-shaped element of FIG. 9 at an inlet location.

In particular, in FIG. 9 ogive-shaped element 80 has grooves 81 that form seats in which baffles 71 and 91 are housed when assembling the device, in order to ensure a substantially fluid tight engagement between adjacent channels defined by the baffles in the annular chamber defined between the peripheral surface 72,92 and a central surface 82.

Figure 8:
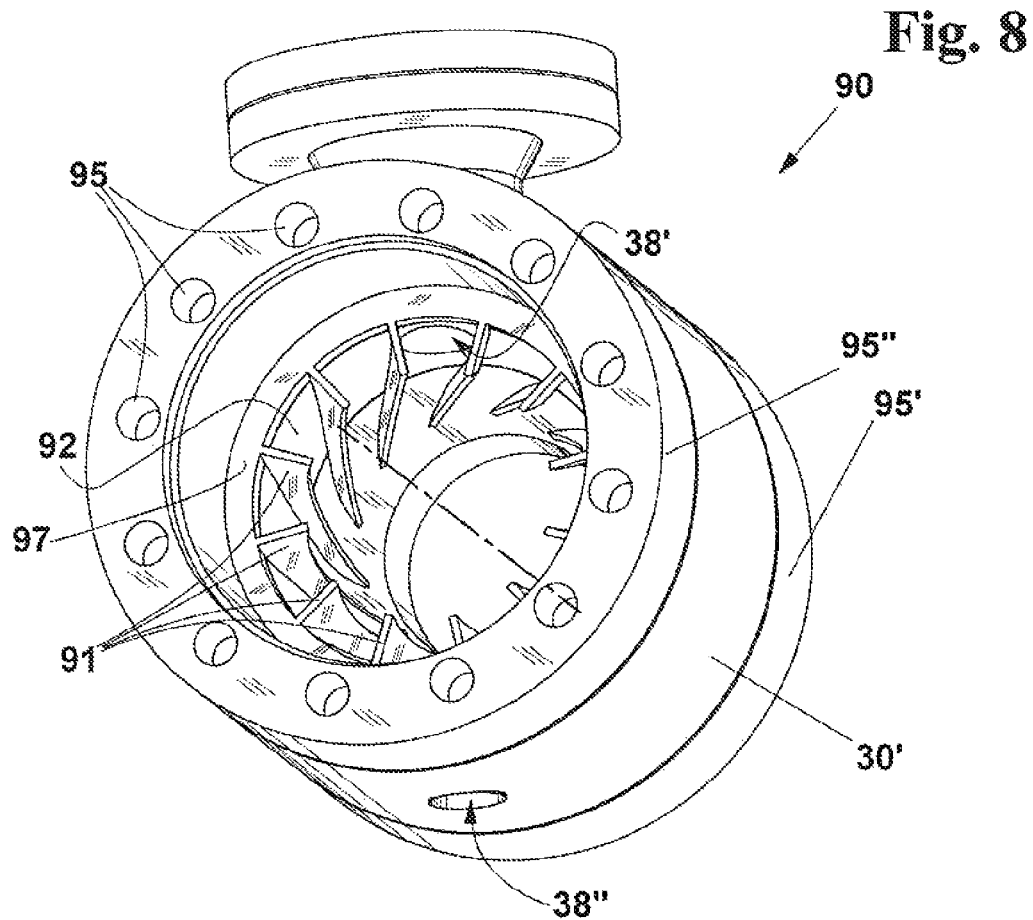
FIG. 8 is a perspective view of the closing element of the device of FIG. 7.

The details that are described along with the exemplary embodiment of FIG. 7" are shown in FIG. 8, and are indicated with the same reference numbers. A shoulder 97 i.e. a transversal surface is also shown, for abutment of a transversal surface 77 corresponding to ring element 70, shown in FIG. 10, when assembling the device. End flanges 95' and 95" of the body of device 30' are also shown, which has screw threaded blind holes 95 for matching with respective flanges of connected ducts.

In the represented exemplary embodiments, all baffles 41,71,91 are integral to a same central or peripheral connection surface 42,72,92, however, an exemplary embodiment may be provided in which some baffles are integral to central surface 42 and other baffles are integral to a peripheral surface 72,92.

Figure 11:
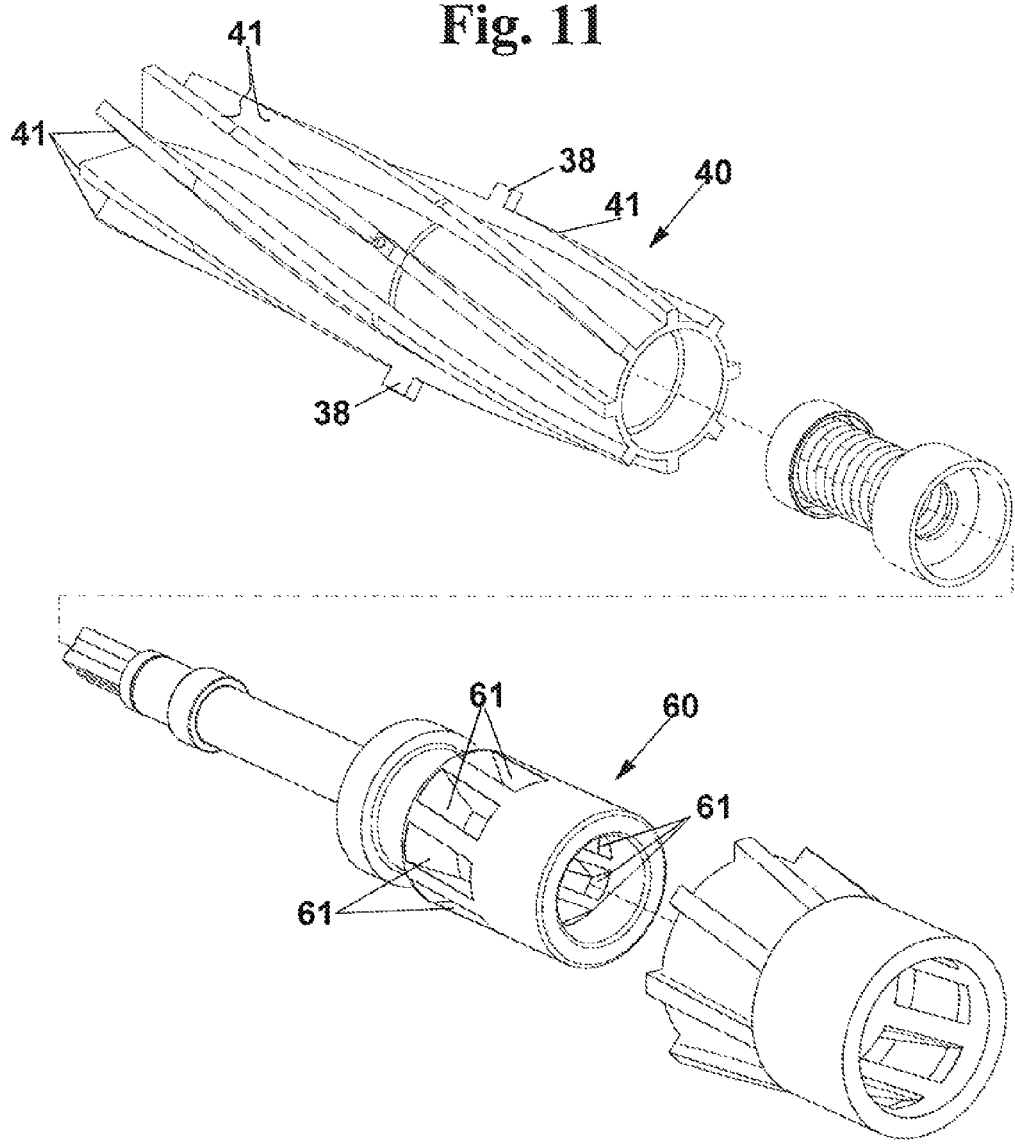
FIG. 11 is an exploded perspective view of an expansion device according to a further exemplary embodiment of the invention.
Figure 12:
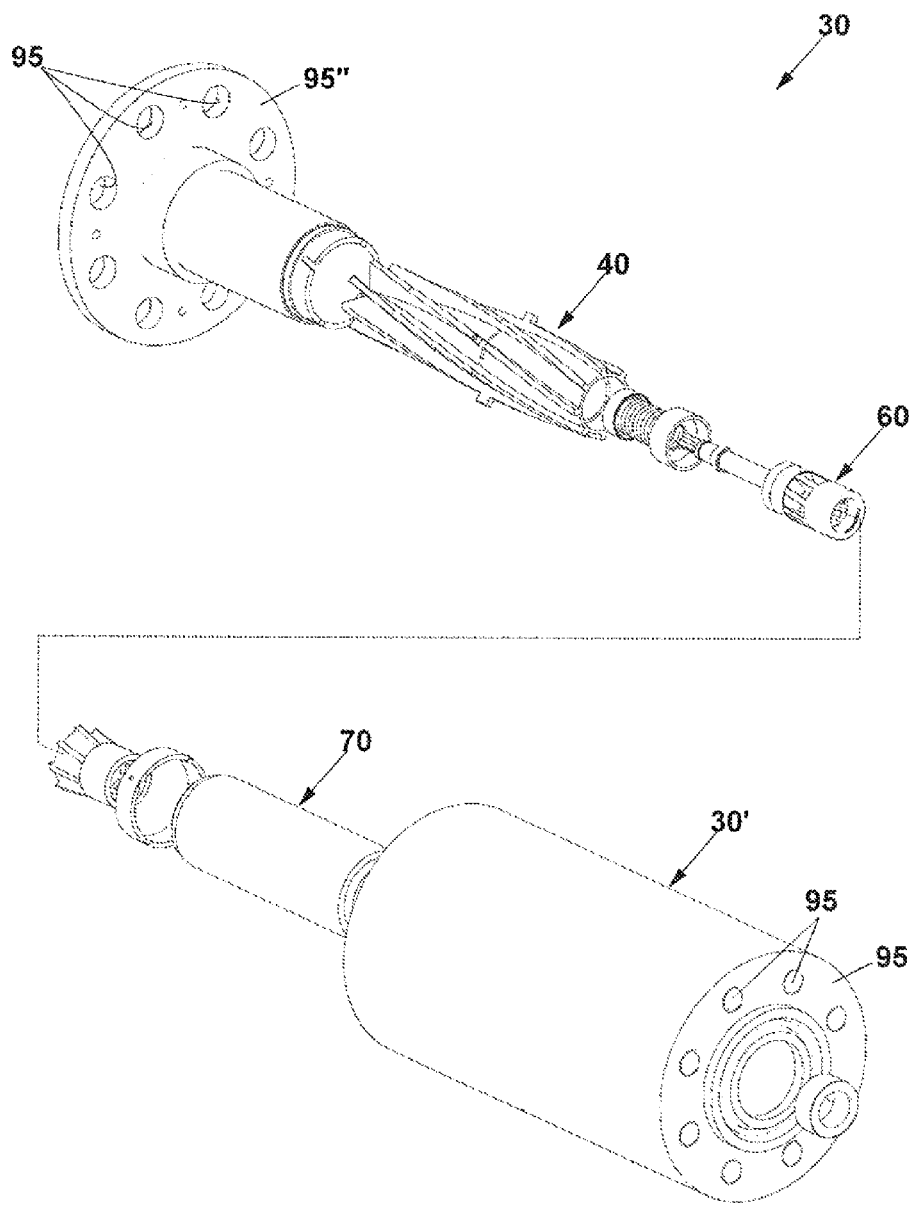
FIG. 12 shows an exploded perspective view of the expansion device of FIG. 11, comprising the inlet and outlet tubular bodies.
Figure 13:
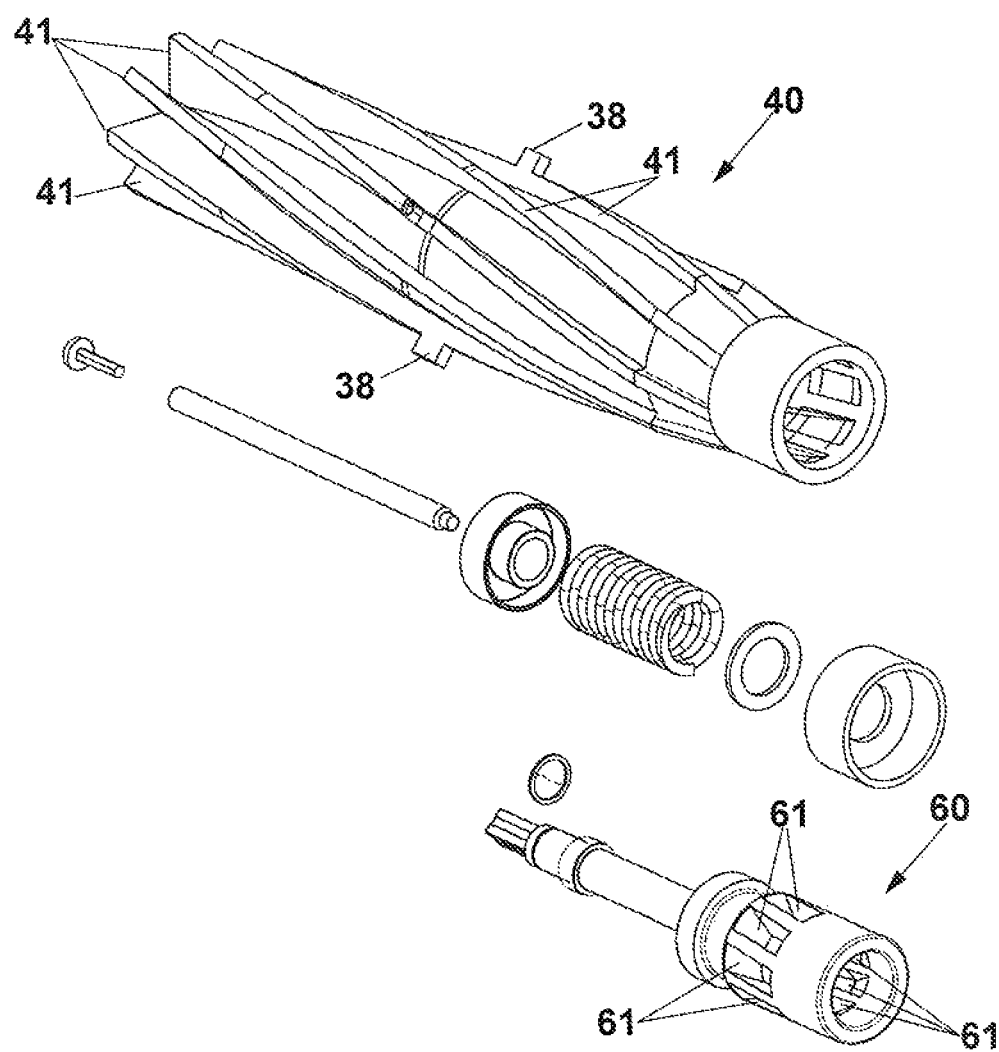
FIG. 13 shows an exploded view of some components of the device of FIGS. 11-12.

With reference to FIGS. 11-13, an exemplary embodiment of the device is depicted showing advantageous exemplary embodiments of the body and of the closing element.

Figure 1:
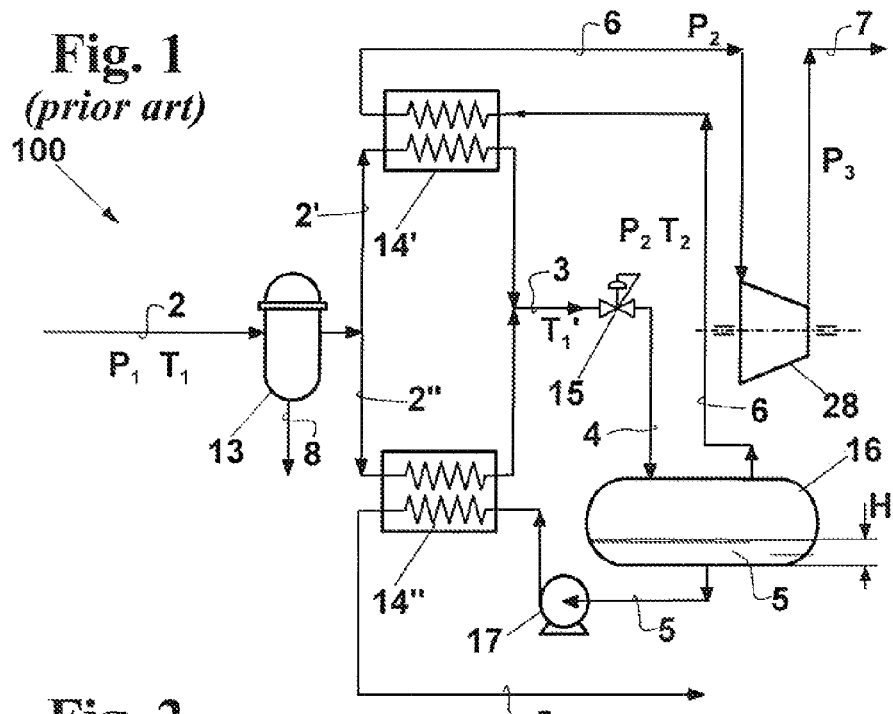
FIG. 1 is a flow diagram of a process for recovering hydrocarbons having two or more carbon atoms from a methane-containing combustible gas.

With reference again to FIG. 1, which has already been partially described along with the prior art, a method and an apparatus 100 are described for carrying out a partial/further liquefaction of a stream 2 of an at least partially gaseous fluid that is available at the predetermined extraction pressure $P_0$, in particular for partially liquefying a stream 2 of a fluid that does not contain any liquid phase. Stream 2 may be a gas that mainly contains methane, for example a natural gas taken from a natural gas pipeline or extracted from a gas field or from gas and crude oil field, or it may be a refinery gas. The extraction pressure $P_0$ may range between tenths and hundreds of atmospheres, in particular it may range between 15 and 300 bar, more in particular it may range between 35 and 130 bar. Stream 2 undergoes a gravity separation of impurities 8, typically of solid and/or liquid particles, inside a cyclone or equivalent separator 13, then it is split into two streams 2' and 2" which are preliminary cooled in respective surface heat exchangers 14' and 14" before being mixed to form stream 3 substantially at an inlet pressure $P_1$ slightly lower than gas extraction pressure $P_0$, i.e. slightly lower than the pressure of stream 2, and at a temperature $T_1$ lower than a temperature $T_0$ of is stream 2.

Stream 3 is supplied to expansion device 30 according to the invention, which has already been described along with its possible exemplary embodiments, where ù the above-described processes occur, and an at least partially gaseous stream 4 is returned at pressure $P_2$ and at temperature $T_2$, lower than $P_1$ and $T_1$ respectively, of stream 3 when it enters device 30.

Stream 4 flows through a separation chamber 16, where it is separated into a liquid fraction 5, which preferably gathers forming a head H controlled by a regulation loop, not shown, and a gas fraction 6, according to a ratio responsive to the pressure drop and to the temperature decrease, i.e. at $P_2$ and $T_2$ pressure and temperature values at the outlet of expansion device 30. For inlet pressure values set between 35 and 130 bar, outlet pressure $P_2$ may range from 3 to 30 bar, and temperature $T_2$ may range from +5° C. to −80° C., according to the input temperature, to the pressure jump and to the composition of the gas.

In the case of a natural gas, or of a similar gas, as previously referred to, which mainly comprises methane and at least one hydrocarbon with more carbon atoms, i.e. a C2+, liquid fraction 5 consists essentially of such C2+(s) and has a composition, with respect to the C2+ content of stream 3, which also depends upon pressure and temperature conditions $P_2$, $T_2$ at the outlet of device 30 and upon pressure and temperature conditions $P_1$, $T_1$ and composition of the gas as fed. Liquid fraction 5 is withdrawn through a pump 17, and is sent to a storage or to a user device, not shown. Liquid fraction 5, which is available at temperature $T_2$ at the outlet of Joule-Thomson expansion device 30, is also used as a cooling fluid in exchanger 14", where portion 2" of stream 2 is preliminary refrigerated.

Still In the case of a natural gas or of a similar gas, gas fraction 6 mainly comprises methane and a heavier hydrocarbons C2+ residue. The remaining amount of C2+ are reduced to such an extent that it can be advantageously sent to the combustion plant together with methane; as a matter of fact, recovering also the C2+ residue into liquid phase 5 would require a more precise separation than what is possible in device 30 by Joule-Thomson effect, which could be obtained by means of complicated and expensive expansion devices, such as turboexpanders, which require expensive gas dehydration operations; in most cases these are not worth the real benefit that may be provided by a C2+ residue recovery.

Device 30 according to the invention can operate even if stream 2, and therefore stream 3, contains a considerable amount of a component that can cause the production of a solid in the stream when cooled down to a certain temperature. Device 30 can treat a mainly gaseous hydrocarbon stream such as natural gas and the like, where water is present in an amount higher than 2+3 ppm, which is a reference maximum admissible value up to which the gas can be treated by a turboexpander of known type. Device 30 can easily treat also a gas that contains a water amount up to the saturation value, which is set between 50 and 200 ppm according to the temperature at which the gas is available, in the case of expansions that occur with a cooling effect down to less than −80° C. In such conditions, a considerable amount of ice and hydrocarbon hydrates is formed, which can travel along passageway 33 of device 30 thanks to the width of the passages provided by the flow reacting means 41, and by other components of the device.

Liquid fraction 6, which is available at temperature $T_2$ that is reached in device 30 according to the Joule-Thomson effect, is used as a cooling fluid in exchanger 14' where a portion 2' of stream 2 is preliminary cooled. Afterwards, gas fraction 6 is compressed to a pressure $P_3$ in a compressor 28, to provide a profitable transfer of a gas fraction 7 from the apparatus 100 to a storing and/or use location, not shown.

Figure 14:
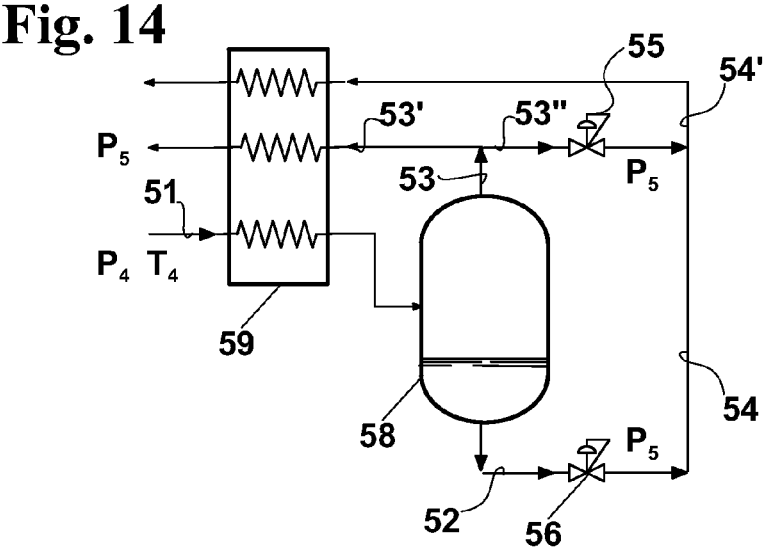
FIG. 14 diagrammatically represents an expansion unit for a gas from a hydrocarbon fraction demethanization unit.

FIG. 14 diagrammatically shows an application of the method according to the invention to the case of an expansion of a stream 51, produced by a demethanization unit. Stream 51 may be a two-phase mixture comprising hydrogen and methane, at a pressure $P_4$ of 30+35 bar g, and at a temperature $T_4$ of about −160° C. Stream 51 is cooled and sent to a separator 58 in which a liquid stream 52 is recovered which consists essentially of methane, and a gas stream 53 is recovered which consists essentially of hydrogen. Methane 52 is expanded and partially vaporized in an expansion device 56 according to the invention, in order to form a methane stream 54 at the pressure $P_5$ of the fuel gas distribution network for which methane 52 is intended. Hydrogen 53 is split into a first part 53' that has to be sent to storage or to a user, not shown, and into a second part 53" that is expanded and cooled in a further expansion device 55 according to the invention, which is also equipped with longitudinal directional wings and not helical wings, said second part subsequently joined to methane stream 54 forming a stream of combustible gas 54'. Expansion devices 55,56 according to the invention allow expansions that substantially approximate isentropic reversible processes from respective initial pressures to respective end expansion pressures, which makes it possible to attain particularly low end expansion temperatures. In particular, this allows expanding a smaller hydrogen stream 53", and therefore to use an expansion device, a pressure regulation device 55, and connection piping of a smaller nominal size. From another point of view, thanks to the lower irreversibility allowed by expansion devices 55,56 according to the invention, with respect to Joule-Thomson valves of known type, the temperature of streams 53', 54' is lower; therefore, stream 51 fed to separator 58 can be more effectively cooled in an exchanger 59, which gives to the process a better global efficiency.

Figure 15:
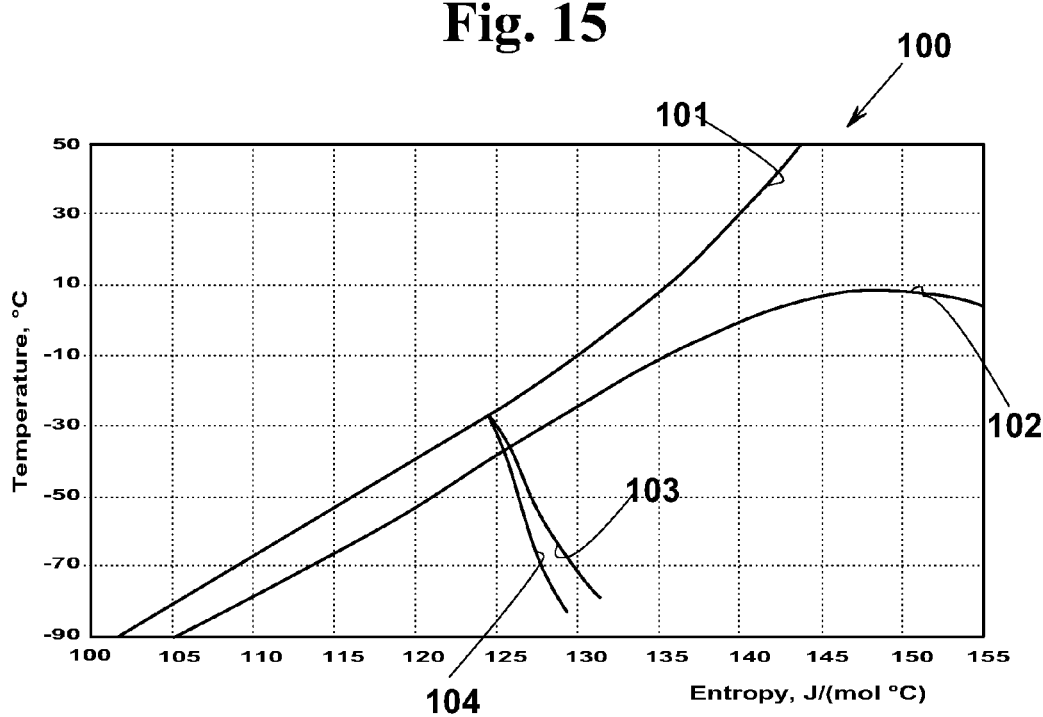
FIG. 15 is an entropy/temperature diagram of the expansion device according to the invention.

In FIG. 15, the slope of the diagram 100 shows the advantages of the method according to the invention, with reference to trends 101, 102, 103 and 104.

The foregoing description of an embodiment of the method and of the apparatus according to the invention, and of the use thereof, will so fully reveal the invention according to the conceptual point of view, so that others, by applying stream knowledge, will be able to modify and/or adapt for various applications such embodiments without further research and without parting from the invention, and it is therefore to be understood that such adaptations and modifications will have to be considered as equivalent to the specific embodiment. The means and the materials to perform the different functions described herein could have a different nature without, for this reason, departing from the field of the invention. It is to be understood that the phraseology or terminology that is employed herein is for the purpose of description and not of limitation.

The invention claimed is:

1. An expansion device for an at least partially gaseous fluid, comprising:
   a tubular inlet portion that is arranged to receive said at least partially gaseous fluid at a predetermined inlet pressure, said tubular inlet portion having an inlet port, an inlet surface consisting of the inner surface of said tubular inlet portion, a longitudinal axis, and a decreasing cross-sectional area, starting from said inlet port;
   a tubular outlet portion for said at least partially gaseous fluid;
   a tubular throat portion between said tubular inlet portion and said tubular outlet portion, such that said tubular portions form a passageway for said at least partially gaseous fluid;
   wherein, in said inlet portion, a central element is arranged to direct said at least partially gaseous fluid according to a flow direction that is generally at an angle with respect to said longitudinal axis, in order to reduce the friction of said at least partially gaseous fluid while flowing through said device, in particular through said throat portion,
   wherein, downstream of said central element, a closing element is provided in said throat portion, said closing element adapted to cause an expansion with a pressure drop down to a predetermined discharge pressure, a cooling and a partial liquefaction of said at least partially gaseous mixture, said closing element adapted to gradually impart to said fluid a substantially swirling direction that is maintained within an inner recess of the closing element and/or within the outlet portion of the expansion device;
   wherein, between said central element and said tubular throat portion, a plurality of continuous helical channels is arranged extending from said tubular inlet portion up to said closing element, said helical channels are configured to impart a swirling movement to said at least partially gaseous fluid from said tubular inlet portion up to said closing element,
   wherein said closing element is a substantially cylindrical hollow body coaxially connected to one end of said central element opposite to said inlet port of said inlet portion, said cylindrical hollow body having a plurality of holes between an outer cylindrical surface and an inner cylindrical surface,
   wherein said helical channels defined by a plurality of baffles that are arranged according to said flow direction along said annular passage, said baffles having an end portion, and wherein said holes of said closing element have corresponding inlet ports that are arranged at said end portions of said baffles, respectively, in such a way that when a stream portion of said at least partially gaseous fluid leaves said channels at said baffle end portions, said stream portion achieves a swirling direction and directly enters a respective hole of said closing element maintaining said swirling direction both in said holes and in an inner recess of said closing element and in said outlet portion of said expansion device.

2. An expansion device according to claim 1, wherein said central element comprises a surface having a solid of revolution shape, in particular, an ogive-shaped surface.

3. An expansion device according to claim 1, wherein each of said baffles is integral with a respective connection surface selected between said central surface and a peripheral surface of said annular chamber.

4. An expansion device according to claim 3, wherein said respective connection surface is the same for all said baffles.

5. An expansion device according to claim 1, wherein said helical channels are arranged along respective adjacent spirals on said connection surface.

6. An expansion device according to claim 1, wherein each of said baffles is housed in a respective seat that is made on a surface of said chamber opposite to said respective connection surface, such that a fluid-tight engagement is provided between adjacent channels of said plurality of channels.

7. An expansion device according to claim 1, wherein said central element is an ogive-shaped element that is arranged to be fixedly arranged within said inlet portion, said ogive-shaped element having an axis that is arranged substantially coincident to said longitudinal axis of said inlet portion.

8. An expansion device according to claim 1, wherein said substantially cylindrical closing element is slidingly arranged within a recess of said central element, such that, as a consequence of a relative sliding movement of said closing element and of said central element, a transversal size change is produced of said throat portion that is defined between said closing element and said peripheral surface.

9. An expansion device according to claim 8, comprising an actuator for causing a sliding movement of said closing element within said recess of said central element, between a first and a second predetermined position.

10. An apparatus for carrying out a partial liquefaction by Joule-Thomson expansion of an at least partially gaseous fluid that is available at a predetermined inlet pressure, said apparatus comprising:
an expansion device according to claim 1;
a feeding inlet for feeding said at least partially gaseous fluid at said inlet pressure into said expansion device through said inlet port;
such that, by feeding said at least partially gaseous fluid into said expansion device, an expansion and a cooling effect of said at least partially gaseous fluid takes place within said passageway, and such that said at least partially gaseous fluid forms a gas fraction and a liquid fraction according to mutual ratios that are responsive to the cooling effect, in particular, wherein said apparatus is adapted to receive, at said inlet pressure, a gas containing methane and at least one hydrocarbon with two or more carbon atoms, such that by feeding said apparatus with said gas, said at least one hydrocarbon with two or more carbon atoms is at least partially separated from said hydrocarbon gas into a liquid fraction.

* * * * *